United States Patent
Liegeois et al.

(10) Patent No.: US 11,780,569 B2
(45) Date of Patent: Oct. 10, 2023

(54) METHOD FOR CONTROLLING AN AIRCRAFT TAXI SYSTEM

(71) Applicant: SAFRAN LANDING SYSTEMS, Velizy Villacoublay (FR)

(72) Inventors: Pierre-Yves Liegeois, Moissy-Cramayel (FR); Laurent Boissard, Moissy-Cramayel (FR); Djemouai Hadjidj, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 17/798,806

(22) PCT Filed: Feb. 11, 2021

(86) PCT No.: PCT/EP2021/053288
§ 371 (c)(1),
(2) Date: Aug. 10, 2022

(87) PCT Pub. No.: WO2021/160719
PCT Pub. Date: Aug. 19, 2021

(65) Prior Publication Data
US 2023/0134203 A1 May 4, 2023

(30) Foreign Application Priority Data
Feb. 11, 2020 (FR) .................................. 2001357

(51) Int. Cl.
*B64C 25/00* (2006.01)
*B64C 25/32* (2006.01)
(Continued)

(52) U.S. Cl.
CPC .......... *B64C 25/405* (2013.01); *B60T 8/1703* (2013.01); *B64C 25/426* (2013.01); *B64D 45/00* (2013.01)

(58) Field of Classification Search
CPC ..... B64C 25/405; B64C 25/426; B64C 25/00; B60T 8/1703; B64D 45/00; Y02T 50/80; G01C 23/00
(Continued)

(56) References Cited

U.S. PATENT DOCUMENTS

2015/0210383 A1* 7/2015 De Mers ................ B64C 25/405
244/50
2018/0162523 A1* 6/2018 Morris .................. B64C 25/445
(Continued)

FOREIGN PATENT DOCUMENTS

EP 3 453 613 A1 3/2019

OTHER PUBLICATIONS

International Search Report for PCT/EP2021/053288 dated Apr. 16, 2021 [PCT/ISA/210].

*Primary Examiner* — Shardul D Patel
(74) *Attorney, Agent, or Firm* — Sughrue Mion, PLLC

(57) ABSTRACT

The invention relates to a method for controlling an aircraft taxi system, comprising the steps of:
generating a traction command (Com) to control an electric motor of a wheel drive actuator;
detecting whether or not an external brake command, intended to control braking of the wheel via the brake, is generated;
if an external braking command is generated, producing a predetermined minimum command (Cmp) to control the electric motor so that the drive actuator applies a strictly positive predetermined minimum motor torque to the wheel during braking;
detecting whether a speed of the aircraft becomes zero and, if so, inhibiting the predetermined minimum command (Cmp) so that the drive actuator applies zero torque to the wheel.

9 Claims, 4 Drawing Sheets

(51) Int. Cl.
  *B60T 8/17*   (2006.01)
  *B64C 25/42*  (2006.01)
  *B64D 45/00*  (2006.01)

(58) Field of Classification Search
  USPC .......................................................... 701/3
  See application file for complete search history.

(56) References Cited

U.S. PATENT DOCUMENTS

2019/0009891 A1* 1/2019 Morris ................... B60T 8/1703
2019/0077500 A1* 3/2019 Kipp ..................... B60T 8/1703
2020/0391856 A1* 12/2020 Knudsen ................ B64D 27/02

* cited by examiner

METHOD FOR CONTROLLING AN AIRCRAFT TAXI SYSTEM

CROSS REFERENCE TO RELATED APPLICATIONS

This application is a National Stage of International Application No. PCT/EP2021/053288 filed Feb. 11, 2021, which is based on and claims priority from French Patent Application No. 2001357 filed Feb. 11, 2020, the contents of each of which being herein incorporated by reference in their entireties.

The invention relates to the field of aircraft taxi systems.

BACKGROUND OF THE INVENTION

It is envisaged to equip certain modern aircraft of a taxi system which makes it possible to move the aircraft on the ground autonomously, i.e. without using the main motors of the aircraft.

The taxi system conventionally comprises a plurality of drive actuators, each intended to rotate one of the wheels of the aircraft.

The taxi system is generally an electric system in which each drive actuator is an electromechanical actuator which comprises an electric motor.

When the pilot of the aircraft decides to use the taxi system to move the aircraft on the ground, it generates a traction setpoint to control the electric motor of each drive actuator so that said drive actuator applies a traction motor torque on the associated wheel, which makes it possible to move the aircraft. The traction motor torque is provided at start-up and all throughout the mission of the taxi system.

However, when the taxi system is used to move the aircraft on the ground and that the pilot decides to brake the aircraft, the kinetic energy of the aircraft is such that the drive actuators and their power system cannot be used to ensure the braking function.

Indeed, the instantaneous power is too great to ensure a deceleration of the aircraft which is compatible with the slowing or stopping distance required. Such an instantaneous power would lead to prohibitive current densities.

Moreover, the kinetic energy of the aircraft is very high and would require, either to use a gigantic electric energy storage capacity, or to implement means to "burn" this oversized electric energy.

Thus, when the taxi system is used to move the aircraft on the ground in a forward motion, the braking of the aircraft is not achieved by the drive actuators, but by the friction brakes which generally equip the braking wheels of the aircraft.

OBJECT OF THE INVENTION

The invention has the object of improving the mechanical strength and the reliability of an aircraft taxi system.

SUMMARY OF THE INVENTION

In view of achieving this aim, a method for controlling an aircraft taxi system is proposed, said taxi system comprising at least one drive actuator arranged to rotate a wheel of the aircraft, said wheel being further equipped with a brake that is separate from the drive actuator, the controlling method comprising the steps of:

generating a traction command to control an electric motor of the drive actuator so that the drive actuator applies a traction motor torque on the wheel, intended to move the aircraft on the ground;

detecting whether an external braking command, intended to command a braking of the wheel via the brake, is generated;

if an external braking command is generated, producing a predetermined minimum command to control the electric motor so that the drive actuator applies a predetermined minimum motor torque on the wheel during braking, which is strictly positive;

detecting if a speed of the aircraft becomes zero and, if so, inhibiting the predetermined minimum command so that the drive actuator applies a zero torque on the wheel.

Thus, when the external braking command is detected and when the wheel is braked by the brake (and not by the drive actuator itself), the electric motor of the drive actuator is not deactivated, but is controlled so that the drive actuator applies a predetermined minimum torque on the wheel.

The deactivation of the electric motor would have the result of leaving the mechanical elements of the drive actuator free during braking, which would generate noise and vibrations during braking, which would tend to mechanically degrading the electric motor and the drive actuator.

On the contrary, when the controlling method according to the invention is used, the predetermined motor torque makes it possible to ensure contact between the teeth integral in rotation of the rotor of the electric motor and those integral with the wheel. Maintaining this contact during braking makes it possible to highly reduce the noise and the vibrations which have been mentioned, and therefore to improve the mechanical strength and the reliability of the taxi system.

Particularly, the predetermined minimum motor torque is defined so as to ensure that during braking, the predetermined minimum command cannot produce a negative quadratic axis current.

Particularly, the predetermined minimum command is defined so that a minimum quadratic axis current Iqmin is such that:

$$Iqmin > Idmax \cdot \sin(\Theta m),$$

where Idmax is a maximum defluxing current which can be applied and where $\Theta m$ is a maximum angular measurement error of an angular position sensor of the rotor of the electric motor, said angular position sensor being used to control the electric motor.

Particularly, the predetermined minimum motor torque is of between 400 N·m and 600 N·m.

Particularly, the external braking command is generated by a pilot of the aircraft using a brake pedal, and the detection of the generation of the external braking command comprises the steps of acquiring an estimation of a press on the brake pedal and of comparing the estimation of the press with at least one predetermined threshold.

The invention also relates to a controlling system arranged to implement such a controlling method, the controlling system comprising:

a control/command module arranged to generate the traction command;

a braking detection module arranged to detect whether the external braking command is generated;

an application module arranged to generate the predetermined minimum command;

a zero speed detection module arranged to detect if the speed of the aircraft becomes zero;

an inhibition module arranged to inhibit the predetermined minimum command when the speed of the aircraft becomes zero.

Particularly, the braking detection module comprises a hysteresis comparator comprising a first input to which an estimation of a press on a brake pedal is applied, a second input to which a high predetermined threshold is applied, and a third input to which a low predetermined threshold is applied, the hysteresis comparator being arranged to perform a comparison of the estimation of the press with the high predetermined threshold and the low predetermined threshold.

Particularly, the application module comprises a first two-way switch having a first input to which the predetermined minimum command is applied, a second input to which the traction command is applied, an output, and a command input to which a braking detection signal is applied, representative of a result of the detection of the braking.

Particularly, the inhibition module comprises a second two-way switch having a first input to which a zero torque command is applied, a second input to which the output of the first two-way switch is applied, and a command input to which a zero speed detection signal is applied, representative of a result of the zero speed detection of the aircraft.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
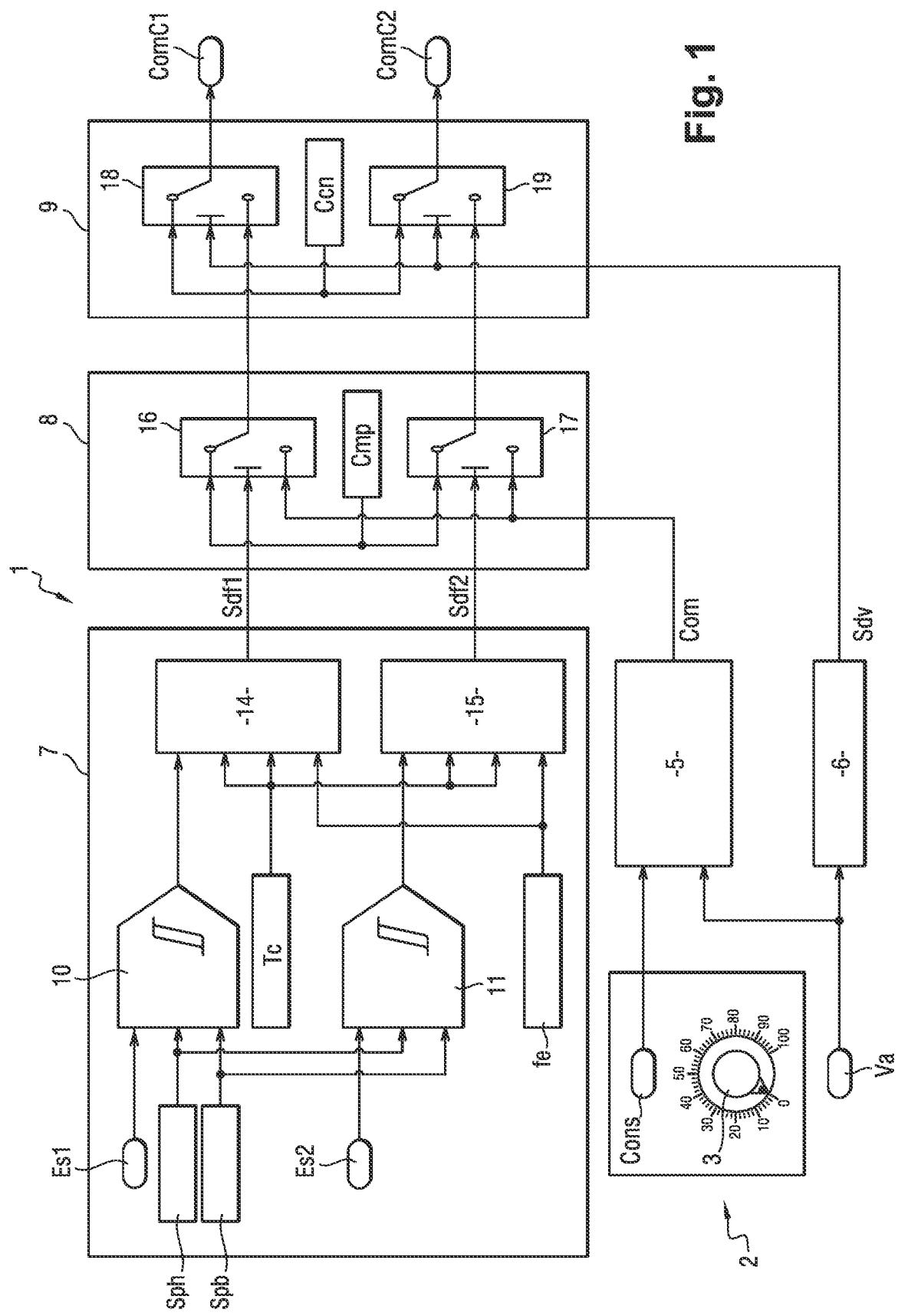
FIG. 1 represents a system for controlling an aircraft taxi system.

The invention is, in this case, implemented in an aircraft which comprises a plurality of landing gears at the bottom of which wheels are mounted. The aircraft also comprises a braking system which makes it possible to brake the aircraft on the ground, and a taxi system which makes it possible to move the aircraft on the ground without using the main motors of the aircraft. The braking system is, in this case, a hydraulic actuation system, but could completely be a different system, for example with electric or electrohydraulic actuation. The taxi system is, in this case, an electric actuation system.

Some of the wheels of the aircraft are both equipped with a brake, which belongs to the braking system, and a drive actuator, which belongs to the taxi system.

The brake of each of these wheels comprises a crown carrying a plurality of braking actuators. A torsion tube is fixed to the crown. The torsion tube extends into the wheel rim. The friction brake also comprises a stack of discs composed of rotors which are integral in rotation with the wheel rim and stators which are integral in rotation with the torsion tube. The braking actuators are arranged to selectively exert, during the pressurised fluid intake, a pressing force on the discs, thus generating a braking torque.

The braking system also comprises a left-hand brake pedal which makes it possible for the pilot to command the brakes of the wheels located on the left-hand side of the aircraft, and a right-hand brake pedal which makes it possible for the pilot to command the brakes of the wheels located on the right-hand side of the aircraft.

The taxi system therefore comprises the drive actuators. Each drive actuator of a wheel is used to rotate said wheel. Each drive actuator is an electromechanical actuator which comprises an electric motor comprising a stator and a rotor.

The drive actuator comprises a gear train. The gear train comprises a first gear wheel integral in rotation with the rotor of the electric motor and comprising first teeth, and a second gear wheel integral in rotation with the wheel and comprising second teeth. The gear train also possibly comprises one or more other gear wheels located between the first gear wheel and the second gear wheel, or a clutch device, or also another mechanical connection element.

When the drive actuator is located in a so-called "meshing" position, the first gear wheel meshes the second gear wheel, thus making it possible for the drive actuator to exert a traction motor torque to rotate the wheel and thus move the aircraft on the ground.

Further to the drive actuators, the taxi system comprises a controlling system of said taxi system, which operates as follows.

When the pilot generates a traction setpoint to move the aircraft on the ground thanks to the taxi system, the controlling system generates a traction command to control the electric motor of the drive actuator of each wheel, so that said drive actuator applies a traction motor torque to said wheel, intended to move the aircraft on the ground.

The controlling system thus detects whether an external braking command, intended to command a braking of the wheel, is generated.

The external braking command is, in this case, produced by the pilot via an action on a brake pedal. It is noted that the external braking command could also be generated differently, for example by an automatic controlling system.

The external braking command aims to brake the aircraft on the ground by acting on the brakes of the braking system (and not on the drive actuators). The brake of a wheel is separate from the drive actuator of said wheel, i.e. these are two different pieces of equipment and not integrated in one another.

If an external braking command is generated, the controlling system produces a predetermined minimum command to control the electric motor so that the drive actuator applies a predetermined minimum motor torque on the wheel. The predetermined minimum motor torque is strictly positive.

Thus, when the pilot commands a braking of the aircraft, which is therefore performed to each wheel, not by the drive actuator, but by the brake of the wheel, the drive actuator of each wheel, despite everything, produces in the same direction, a non-zero motor torque, but equal to the predetermined minimum motor torque. The predetermined minimum motor torque makes it possible to ensure, during braking, a contact between the first teeth integral in rotation with the rotor of the electric motor and the second teeth integral with the wheel.

The controlling system thus detects if a speed of the aircraft becomes zero, and if so, the controlling system inhibits the predetermined minimum command so that the drive actuator applies a zero torque to the wheel.

For this, in reference to FIG. 1, the controlling system 1 first comprises a command interface 2 integrated in the cockpit and which makes it possible for the pilot to command the taxi system. The command interface 2 comprises a rotary button 3 and a percentage graduation (from 0 to 100%) to produce a traction setpoint Cons.

The controlling system 1 also comprises a control/command module 5, a zero speed detection module 6, a braking detection module 7, an application module 8 and an inhibition module 9.

In this case, it is noted that these modules can be achieved by hardware and/or software means, and be integrated in one or more pieces of equipment (computer, controller, data concentrator, etc.).

The control/command module 5 acquires the traction setpoint Cons and an estimation of the speed of the aircraft Va, implements control/command laws, and generates a traction command Com.

The zero speed detection module 6 acquires the estimation of the speed of the aircraft Va, detects whether the estimation of the speed of the aircraft Va is zero, and produces a zero speed detection signal Sdv representative of the result of this detection.

The braking detection module 7 comprises a first hysteresis comparator 10 and a second hysteresis comparator 11.

The first hysteresis comparator 10 comprises a first input to which an estimation of a press Es1 of the pilot on the left-hand brake pedal (as a percentage) is applied, a second input to which a high predetermined threshold Sph (as a percentage) is applied, and a third input to which a low predetermined threshold Spb (as a percentage) is applied.

Likewise, the second hysteresis comparator 11 comprises a first input to which an estimation of a press Es2 of the pilot on the right-hand brake pedal (as a percentage) is applied, a second input to which the high predetermined threshold Sph is applied, and a third input to which the low predetermined threshold Spb is applied.

The braking detection module 7 also comprises a first confirmer block 14 and a second confirmer block 15.

The first confirmer block 14 comprises a first input connected to the output of the first hysteresis comparator 10, a second input and a third input to which a confirmation time Tc is applied, and a fourth input to which a sampling frequency fe is applied.

Likewise, the second confirmer block 15 comprises a first input connected to the output of the second hysteresis comparator 11, a second input and a third input to which the confirmation time Tc is applied, and a fourth input to which the sampling frequency fe is applied.

The application module 8 comprises a first two-way switch 16 having a first input to which a predetermined minimum command Cmp is applied, a second input connected to the output of the control/command module 5, and a command input connected to the output of the first confirmer block 14.

The application module 8 further comprises a first two-way switch 17 having a first input to which the predetermined minimum command Cmp is applied, a second input connected to the output of the control/command module 5, and a command input connected to the output of the second confirmer block 15.

The inhibition module 9 comprises a second two-way switch 18 having a first input to which a zero torque command Ccn (equal to 0 N·m) is applied, a second input connected to the output of the first two-way switch 16 of the application module 8, and a command input connected to the output of the zero speed detection module 6.

The inhibition module 9 further comprises a second two-way switch 19 having a first input to which the zero torque command Ccn (equal to 0 N·m) is applied, a second input connected to the output of the first two-way switch 17 of the application module 8, and a command input connected to the output of the zero speed detection module 6.

The operation of the controlling system 1 is now described in more detail.

When the pilot generates a traction setpoint Cons by using the command interface 2 to move the aircraft on the ground, the control/command module 5 generates a traction command Com which makes it possible to move the aircraft on the ground.

As has been seen above, it is the braking system which is used to brake the aircraft.

The controlling system 1 makes it possible to apply to each wheel, a predetermined minimum motor torque, when the speed of the aircraft is non-zero and that a braking is commanded.

The braking detection module 7 makes it possible to detect whether a breaking command is generated.

For this, the first hysteresis comparator 10 compares the estimation of the press Es1 of the pilot on the left-hand brake pedal with the high predetermined threshold Sph and the low predetermined threshold Spb. The hysteresis makes it possible to avoid unintentional state changes of the status of the braking phase.

Likewise, the second hysteresis comparator 11 compares the estimation of the press Es2 of the pilot on the right-hand brake pedal with the high predetermined threshold Sph and the low predetermined threshold Spb.

The first confirmer block 14 makes it possible to confirm the detection of the left-hand braking when a status (braking detected or braking undetected) is maintained during a duration greater than or equal to the confirmation time Tc. The first confirmer block 14 produces at its output, a braking detection signal Sdf1, representative of a result of the detection of the braking on the left-hand side of the aircraft.

Likewise, the second confirmer block 15 makes it possible to confirm the detection of the right-hand braking when a status (detected braking or undetected braking) is maintained during a duration greater than or equal to the confirmation time Tc. The second confirmer block 15 produces at its output, a braking detection signal Sdf2, representative of a result of the detection of the braking on the right-hand side of the aircraft.

If the first confirmer block 14 produces an active braking detection signal Sdf1, thus meaning that an external braking command has been generated via the left-hand braking pedal, the first input of the first two-way switch 16 of the application module 8 is connected to the output of said first two-way switch 16, and therefore the predetermined minimum command Cmp is applied to the output of said two-way switch 16.

However, if the first confirmer block 14 produces an inactive braking detection signal Sdf1, the second input of the first two-way switch 16 of the application module 8 is connected to the output of said first two-way switch 16, and therefore the traction command Com is applied to the output of said first two-way switch 16.

Likewise, if the second confirmer block 15 produces an active braking detection signal Sdf2, thus meaning that an external braking command has been generated via the right-hand braking pedal, the first input of the first two-way switch 17 of the application module 8 is connected to the output of said first two-way switch 17, and therefore the predetermined minimum command Cmp is applied to the output of said first two-way switch 17.

However, if the second confirmer block 15 produces an inactive braking detection signal Sdf2, the second input of the first two-way switch 17 of the application module 8 is connected to the output of said first two-way switch 17, and therefore the traction command Com is applied on the output of said first two-way switch 17.

The application module 8 thus generates the predetermined minimum command Cmp.

If the zero speed detection module 6 produces an inactive zero speed detection signal, representative of the detection of a non-zero speed of the aircraft, the second input of the second two-way switch 18 of the inhibition module 9 is connected to the output of said second two-way switch 18. Likewise, the second input of the second two-way switch 19 of the inhibition module 9 is connected to the output of said second two-way switch 19.

Consequently, if the speed of the aircraft is not zero and that a braking is detected for the left-hand side (i.e. if the braking detection module 7 detects that an external braking command is generated for the left-hand side), the controlling system 1 produces a torque command ComC1 for the drive actuators of the wheels of the left-hand side, which is equal to the predetermined minimum command Cmp. Each drive actuator of the left-hand side applies the predetermined motor torque to the associated wheel. Likewise, if the speed of the aircraft is not zero and that a braking is detected for the right-hand side (i.e. if the braking detection module 7 detects that an external braking command is generated for the right-hand side), the controlling system 1 produces a torque command ComC2 for the drive actuators of the wheels of the right-hand side, which is equal to the predetermined minimum command Cmp. Each drive actuator of the right-hand side applies the predetermined minimum motor torque to the associated wheel.

However, if the speed of the aircraft is not zero and that a braking is not detected (not for the left-hand side, nor for the right-hand side), the controlling system 1 generates a torque command ComC1 equal to the traction command Com produced from the traction setpoint Cons generated by the pilot. Each drive actuator of the left-hand side applies a traction motor torque to the wheel, intended to move the aircraft on the ground. Likewise, the controlling system 1 generates a torque command ComC2 equal to the traction command Com produced from the traction setpoint Cons generated by the pilot. Each drive actuator of the right-hand side applies a traction motor torque on the wheel, intended to move the aircraft on the ground.

If the zero speed detection module 6 produces an active zero speed detection signal Sdv, representative of the detection of a zero speed of the aircraft, the first input of the second two-way switch 18 of the inhibition module 9 is connected to the output of said second two-way switch 18, and therefore the controlling system 1 inhibits the predetermined minimum command by generating a zero torque command ComC1 (equal to the zero torque command Ccn) to control each drive actuator of the wheels of the left-hand side. The drive actuator of each wheel of the left-hand side applies a zero torque to said wheel. Likewise, the first input of the second two-way switch 19 of the inhibition module 9 is connected to the output of said second two-way switch 19, and therefore the controlling system 1 inhibits the predetermined minimum command by generating a zero torque command ComC2 (equal to the zero torque command Ccn) to control each drive actuator of the wheels of the right-hand side. The drive actuator of each wheel of the right-hand side applies a zero torque to said wheel.

The way in which the predetermined minimum motor torque is defined is now described (which is strictly positive).

The electric motor of each drive actuator is, in this case, a synchronous magnet motor, controlled by a converter which powers the phases of the motor so that the torque generated by the drive actuator corresponds to the torque command.

The Park's transformation is used to model the powering of the electric motor. The electric motor is powered along the quadratic axis and along the direct axis. The direct axis corresponds to the magnetisation axis of the magnets of the electric motor.

The powering along the quadratic axis makes it possible to produce the torque. The powering along the direct axis makes it possible deflux the electric motor to limit the flux of the magnets, which makes it possible to lower the electromotor force of the electric motor and therefore to optimise the current size of the converter. The electric motor used, in this case, is highly defluxed at a high speed.

Figure 2:
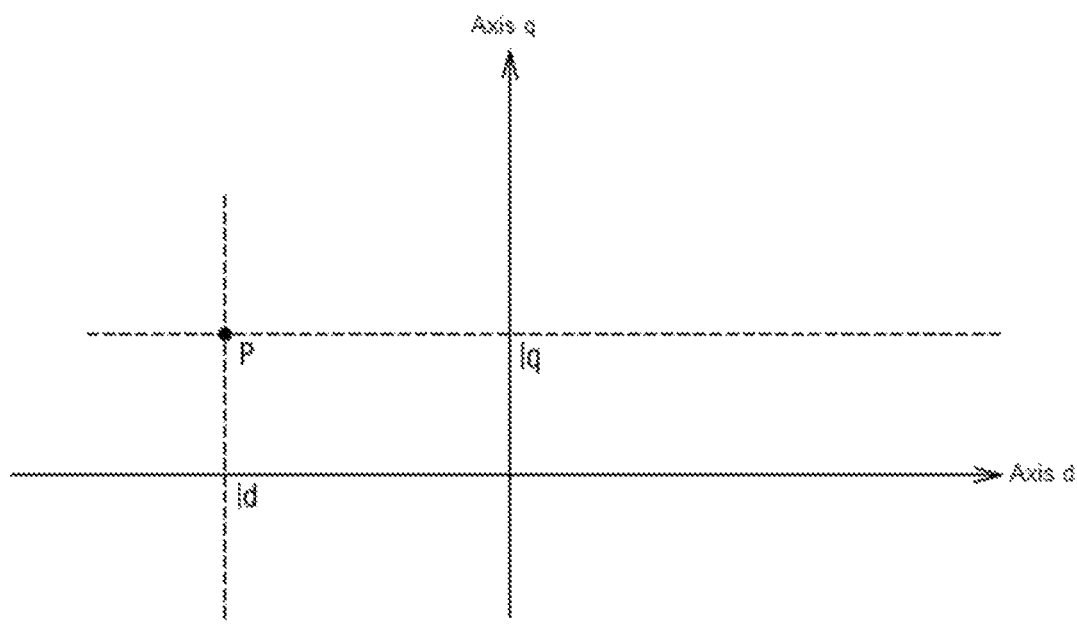
FIG. 2 represents a graph showing, in a Park's reference frame, an operating point of an electric motor of a drive actuator while the torque generated is a traction torque.

In FIG. 2, the operating point P of the electric motor is represented, while the torque to be generated is a traction motor torque intended to move the aircraft when this is on the ground, and that the speed is high.

The quadratic axis current Iq (Axis q) makes it possible to produce the torque command. The quadratic axis current Iq is a positive current, as the traction motor torque is a positive torque.

The direct axis current Id (Axis d), which is the high-speed defluxing current, is a negative current.

It is seen that the absolute value of the direct axis current Id is around equal to double the absolute value of the quadratic axis current Iq.

The knowledge of the quadratic axis and of the direct axis is obtained by measuring the angular position of the rotor of the electric motor with respect to the phases of the stator (which are fixed in space). The measurement of the angular position of the rotor is provided by an angular position sensor, which is, in this case, a resolver, of which the angular position measurements make it possible to control the electric motor.

Yet, the angular position measurements produced by the resolver include a non-zero angular measurement error (also called indexing error).

Figure 3:
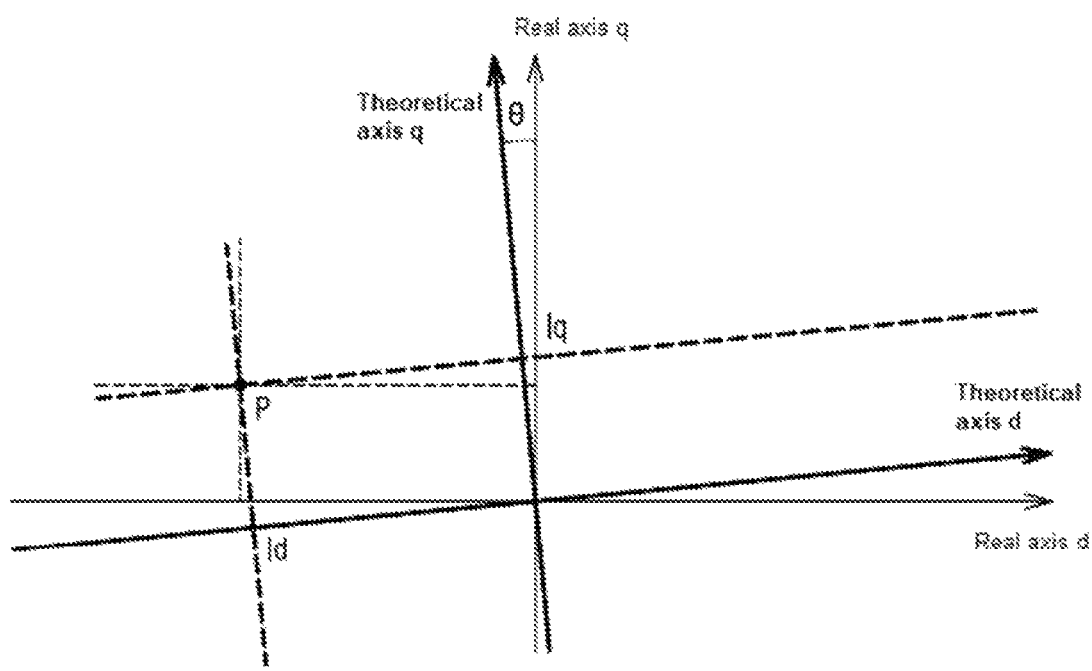
FIG. 3 represents a graph similar to that of FIG. 2, comprising a real quadratic axis and direct axis, as well as a theoretical quadratic axis and direct axis.

It is seen in FIG. 3, that the real quadratic axis (real Axis q) and the real direct axis (real Axis d) are oriented with respect to the theoretical quadratic axis (theoretical Axis q) and to the theoretical direct axis (theoretical Axis d) at an angle equal to the angular measurement error $\theta$.

The Iq and Id values are thus modified, and the following is had:

$$Idreal = Idtheoretical \cdot \cos\theta - Iqtheoretical \cdot \sin\theta$$

$$Iqreal = Idtheoretical \cdot \sin\theta + Iqtheoretical \cdot \cos\theta$$

the Iqs being positive and the Ids being negative.

The value of the torque generated is therefore modified by a value equal to:

Idtheoretical·sin θ which depends on the θ sign. As Id is negative, the torque generated is lower if θ is positive and stronger if θ is negative.

The defluxing value is itself modified by a value equal to:

−Igtheoretical·sin θ which depends on the θ sign. This can pose strength problems if θ is negative.

Moreover, it has been seen that, when the aircraft is moved thanks to the taxi system and when the aircraft must be braked, these are the brakes of the braking system which are used. However, a residual torque is maintained, equal to the predetermined minimum motor torque, to maintain a contact between the first teeth and the second teeth in the gear train. The minimum motor torque must be sufficiently high to avoid passing into braking mode when the pilot brakes at a high speed (under high defluxing).

Figure 4:
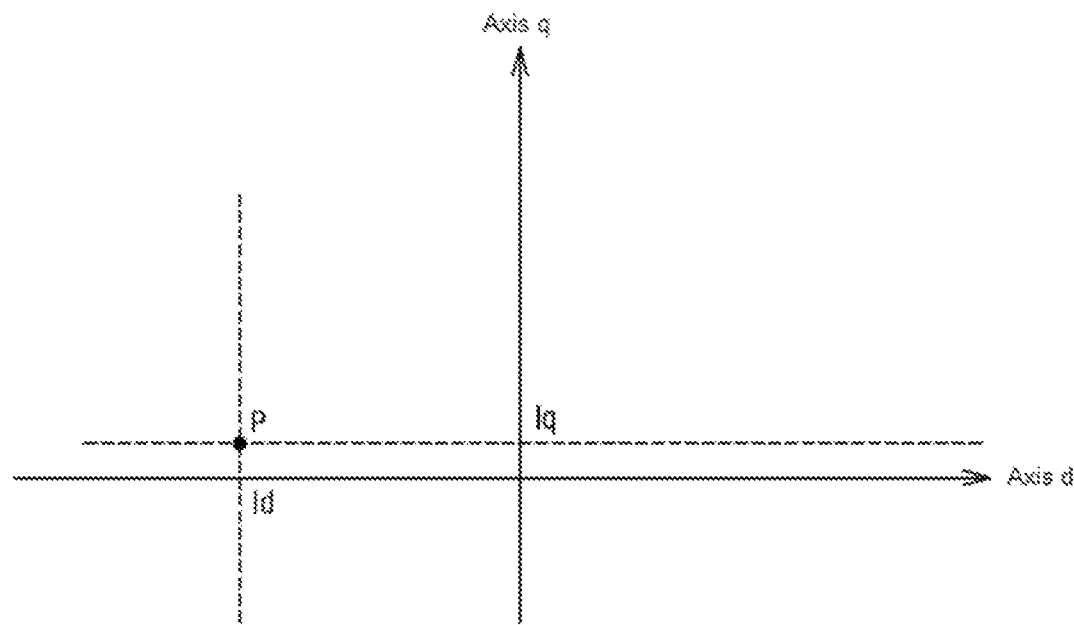
FIG. 4 represents a graph similar to that of FIG. 2, during a high-speed braking.
Figure 5:
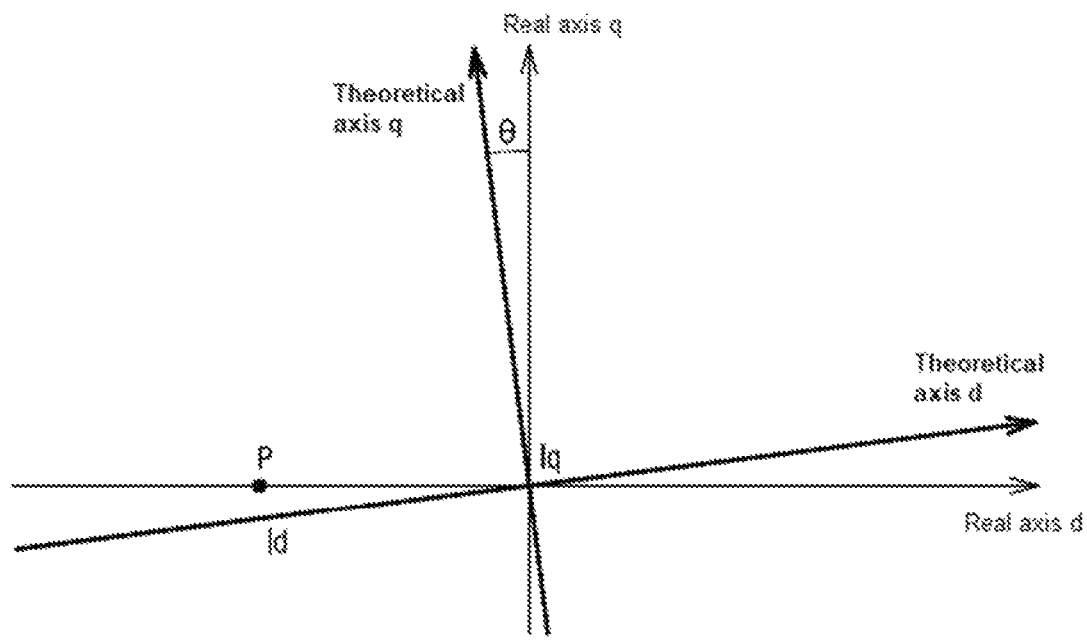
FIG. 5 represents a graph similar to that of FIG. 4, comprising a real quadratic axis and direct axis, as well as a theoretical quadratic axis and direct axis.

FIGS. 4 and 5 illustrate this situation of the aircraft at high speed during braking.

It is seen in these figures that the torque applied is lower and that, by considering the angular measurement error, the applied torque could become negative, which would lead to making the drive actuator pass into a braking mode (the electric motor is thus an electric energy generator, which poses the instantaneous power and storage problems mentioned above).

To avoid this situation occurring, it has been envisaged to improve the resolver to decrease the angular measurement error. It has also been envisaged to add a software resetting of the mechanical installation of the resolver in the electric motor. However, the risk of error remains too high as a few tenths of a degree suffice to substantially disrupt the value of the applied torque, as soon as the electric motor is highly defluxed, as is the case here.

Therefore, the predetermined motor torque is defined so as to ensure that during braking, the predetermined minimum command does not produce a negative quadratic axis current.

The predetermined minimum command is therefore defined so that the minimum quadratic axis current Iqmin is such that:

Iqmin>Idmax·sin(θm), where Idmax is a maximum defluxing current which can be applied and where θm is a maximum angular measurement error of the resolver.

The predetermined minimum motor torque chosen therefore prohibits an operation of the generating electric motor, and therefore to recover the power.

To the angular measurement error, the current measurement error must also be added (which increase uncertainty on the positioning of the operating point and therefore on the torque applied), the manufacturing tolerances of the electric motor (which involve more or less back electromotive force), the temperature of the coils and of the magnets of the electric motor, the voltage of the electric network, which involves defluxing more or less, and the gradient of the variation of the voltage of the electric network, which obligates to add a margin on the defluxing current.

The predetermined minimum motor torque is therefore greater than a predetermined torque threshold which makes it possible to ensure that, whatever the operating conditions of the controlling system, the applied torque remains a motor torque.

Given these requirements, a predetermined minimum motor torque of between 400 N·m and 600 N·m is used, advantageously equal to 500 N·m (equivalent returned to the wheel). It is noted that, for an Airbus A320-type aircraft, the maximum value of the braking torque, produced by the brake of a wheel, can go up to (around) 6700 N·m to the wheel. This maximum braking torque corresponds to the value of 2400 daN which itself corresponds to the retardation force prohibited by the certification specification CS25.1309 above V1 during take-off.

The predetermined minimum motor torque is permanently applied, i.e. both when the drive actuator produces a traction motor torque and when the aircraft is braked by the braking system.

Figure 6:
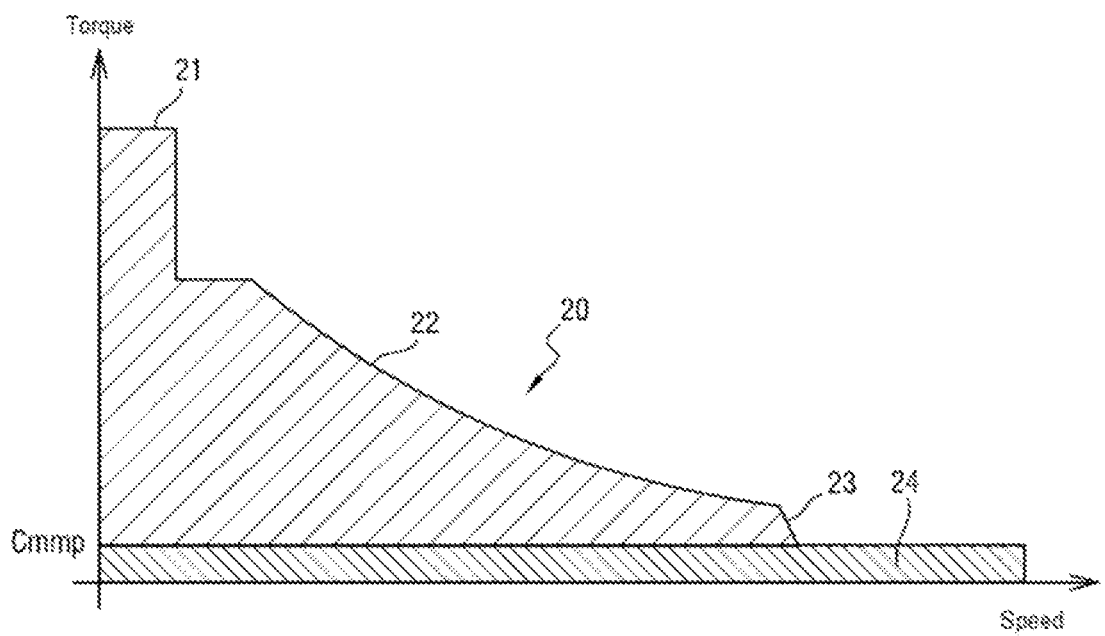
FIG. 6 represents a graph comprising a curve of a torque/speed characteristic of the electric motor.

In FIG. 6, the torque/speed characteristic 20 of the electric motor of each drive actuator conventionally has a constant ordinate zone 21 at a very low speed corresponding to the take-off torque, a power limitation zone 22 and a high-speed strength zone 23. This "conventional" torque/speed 20 characteristic has been modified to integrate a "prohibited" grey zone 24 there. The torque generated is always greater than or equal to the predetermined minimum motor torque Cmmp which is equal to 500 N·m and this, whatever the speed of the aircraft.

Naturally, the invention is not limited to the embodiment described, but covers any variant coming within the scope of the invention such as defined by the claims.

The invention claimed is:

1. A method for controlling a taxi system of an aircraft, said taxi system comprising at least one drive actuator arranged to rotate a wheel of the aircraft, said wheel being further equipped with a brake that is separate from the drive actuator, the method comprising:
    generating a traction command to control an electric motor of the drive actuator so that the drive actuator applies a traction motor torque on the wheel, intended to move the aircraft on the ground;
    detecting whether an external braking command, intended to command a braking of the wheel via the brake, is generated;
    if an external braking command is generated, producing a predetermined minimum command to control the electric motor so that the drive actuator applies a predetermined minimum motor torque on the wheel during braking, which is strictly positive; and
    detecting if a speed of the aircraft becomes zero and, if so, inhibiting the predetermined minimum command so that the drive actuator applies a zero torque on the wheel.

2. The method according to claim 1, wherein the predetermined minimum motor torque is defined so as to ensure that during braking, the predetermined minimum command cannot produce a negative quadratic axis current.

3. The method according to claim 2, wherein the predetermined minimum command is defined so that a minimum quadratic axis current Iqmin is such that:

Iqmin>Idmax·sin($\Theta_m$), where Idmax is a maximum defluxing current which can be applied and where $\Theta_m$ is a maximum angular measurement error of an angular position sensor of the rotor of the electric motor, said angular position sensor being used to control the electric motor.

4. The method according to claim 1, wherein the predetermined minimum motor torque is of between 400 N·m and 600 N·m.

5. The method according to claim 1, wherein the external braking command is generated by a pilot of the aircraft using a brake pedal, and wherein the detection of the generation of the external braking command comprises the steps of acquiring an estimation of a press on the brake pedal and of comparing the estimation of the press with at least one predetermined threshold.

6. A system for controlling an aircraft taxi system, the system being arranged to implement the method according to claim 1, the controlling system comprising:
- a control/command module arranged to generate the traction command;
- a braking detection module arranged to detect whether the external braking command is generated;
- an application module arranged to generate the predetermined minimum command;
- a zero speed detection module arranged to detect if the speed of the aircraft becomes zero; and
- an inhibition module arranged to inhibit the predetermined minimum command when the speed of the aircraft becomes zero.

7. The system according to claim 6, wherein the braking detection module comprises a hysteresis comparator comprising a first input to which an estimation of a press on a brake pedal is applied, a second input on which a high predetermined threshold is applied, and a third input to which a low predetermined threshold is applied, the hysteresis comparator being arranged to perform a comparison of the estimation of the press with the high predetermined threshold and the low predetermined threshold.

8. The system according to claim 6, wherein the application module comprises a first two-way switch having a first input to which the predetermined minimum command is applied, a second input to which the traction command is applied, an output, and a command input to which a braking detection signal is applied, representative of a result of the detection of the braking.

9. The system according to claim 8, wherein the inhibition module comprises a second two-way switch having a first input to which a zero torque command is applied, a second input to which the output of the first two-way switch is applied, and a command input to which a zero speed detection signal is applied, representative of a result of the zero speed detection of the aircraft.

* * * * *